US012215301B2

(12) United States Patent
Budde et al.

(10) Patent No.: US 12,215,301 B2
(45) Date of Patent: Feb. 4, 2025

(54) MAGNESIUM CARBONATE AS A CARRIER FOR THE RELEASE OF ACTIVE AGENTS IN A HOME CARE FORMULATION

(71) Applicant: OMYA INTERNATIONAL AG, Oftringen (CH)

(72) Inventors: Tanja Budde, Brittnau (CH); Tobias Keller, Holziken (CH)

(73) Assignee: OMYA INTERNATIONAL AG, Oftringen (CH)

( * ) Notice: Subject to any disclaimer, the term of this patent is extended or adjusted under 35 U.S.C. 154(b) by 901 days.

(21) Appl. No.: 16/960,939

(22) PCT Filed: Jan. 25, 2019

(86) PCT No.: PCT/EP2019/051835
§ 371 (c)(1),
(2) Date: Jul. 9, 2020

(87) PCT Pub. No.: WO2019/145467
PCT Pub. Date: Aug. 1, 2019

(65) Prior Publication Data
US 2020/0347326 A1 Nov. 5, 2020

(30) Foreign Application Priority Data

Jan. 26, 2018 (EP) .................... 18153662

(51) Int. Cl.
*C11D 7/12* (2006.01)
*C01F 5/24* (2006.01)
*C11D 3/12* (2006.01)
*C11D 7/02* (2006.01)

(52) U.S. Cl.
CPC ............ *C11D 7/02* (2013.01); *C01F 5/24* (2013.01); *C11D 3/1233* (2013.01); *C01P 2004/51* (2013.01); *C01P 2004/61* (2013.01); *C01P 2006/12* (2013.01); *C01P 2006/14* (2013.01); *C01P 2006/80* (2013.01)

(58) Field of Classification Search
CPC .... C11D 7/02; C11D 7/12; C11D 3/10; C11D 3/14; C11D 3/502; C11D 3/505; C11D 9/12; C11D 17/0034
See application file for complete search history.

(56) References Cited

U.S. PATENT DOCUMENTS

| 1,935,418 | A | | 9/1909 | Sisson | |
|---|---|---|---|---|---|
| 1,361,324 | A | | 12/1920 | Grunwald | |
| 4,303,542 | A | * | 12/1981 | Heinlein | C11D 17/0039 510/348 |
| 4,407,789 | A | * | 10/1983 | Eigen | A61K 8/9794 424/65 |
| 4,557,853 | A | * | 12/1985 | Collins | C11D 9/18 510/141 |
| 4,756,846 | A | * | 7/1988 | Matsuura | C11D 3/046 134/40 |
| 5,219,574 | A | * | 6/1993 | Wehling | A61K 9/2013 514/960 |
| 5,525,331 | A | * | 6/1996 | Betts | A61K 8/37 424/65 |
| 5,979,461 | A | | 11/1999 | Bensalem et al. | |
| 2004/0214736 | A1 | * | 10/2004 | Modi | A61Q 17/02 510/238 |
| 2005/0129606 | A1 | * | 6/2005 | Mitsuhashi | D21H 17/675 423/430 |
| 2009/0252815 | A1 | * | 10/2009 | Walzer | A61L 15/46 424/616 |
| 2012/0211031 | A1 | * | 8/2012 | Loeffler | C11D 3/3707 526/263 |
| 2015/0298984 | A1 | * | 10/2015 | Strömme | B01J 20/28066 423/430 |
| 2017/0151168 | A1 | * | 6/2017 | Constantine | A61K 8/29 |
| 2018/0098920 | A1 | * | 4/2018 | Erkens | A61K 8/23 |

FOREIGN PATENT DOCUMENTS

| DE | 102007051093 A1 | | 4/2009 |
|---|---|---|---|
| EP | 0526121 A1 | | 2/1993 |
| EP | 1475351 | * | 10/2004 |
| EP | 1475351 A1 | | 11/2004 |
| EP | 2322581 A1 | | 5/2011 |
| GB | 544907 A | | 5/1942 |
| GB | 548197 A | | 9/1942 |
| GB | 594262 A | | 11/1947 |
| GB | 2109399 A | | 6/1983 |
| JP | H05125400 A | | 5/1993 |
| JP | 2004161600 A | | 6/2004 |
| JP | 2005220082 A | | 8/2005 |
| RU | 2350637 C2 | | 3/2009 |
| WO | 2009/053239 A2 | | 4/2009 |

OTHER PUBLICATIONS

International Search Report from PCT/EP2019/051835, mailed Apr. 9, 2019, 3 pages.
Written Opinion from PCT/EP2019/051835, mailed Apr. 9, 2019, 8 pages.
Gane et al. (1996) "Void Space Structure of Compressible Polymer Spheres and Consolidated Calcium Carbonate Paper-Coating Formulations" Ind. Eng. Chem. Res., vol. 35, pp. 1753-1764.
Regulation (EC) No. 648/2004 Of the European Parliament and of the Council of Mar. 31, 2004 on Detergents (54 pages).

(Continued)

*Primary Examiner* — Charles I Boyer
(74) *Attorney, Agent, or Firm* — ALGM LLP; Harry J. Guttman

(57) ABSTRACT

The present invention relates to a carrier material for the release of one or more active agent(s) in a home care formulation, a delivery system for the release of one or more active agent(s) in a home care formulation, a home care formulation comprising the delivery system for the release of one or more active agent(s), a method for preparing the delivery system for the release of one or more active agent(s) in a home care formulation as well as the use of the delivery system for the release of one or more active agent(s) in a home care formulation.

21 Claims, No Drawings

(56) References Cited

OTHER PUBLICATIONS

JP Patent Appl. No. JP2004161600A (Jun. 10, 2004)—English-language abstract from Espacenet, 1 page.
JP Patent Appl. No. JP2005220082A (Aug. 18, 2005)—English-language abstract from Espacenet, 1 page.
JP Patent Appl. No. JPH05125400A (May 21, 1993)—English-language abstract from Espacenet, 1 page.

\* cited by examiner

MAGNESIUM CARBONATE AS A CARRIER FOR THE RELEASE OF ACTIVE AGENTS IN A HOME CARE FORMULATION

CROSS-REFERENCE TO RELATED APPLICATIONS

This application is a National Stage Entry of International Application No. PCT/EP2019/051835 filed Jan. 25, 2019, entitled "CARRIER MATERIAL FOR THE RELEASE OF ONE OR MORE ACTIVE AGENT(S) IN A HOME CARE FORMULATION", and which claims priority to EP Application Serial No. 18153662.4 filed Jan. 26, 2018 entitled "CARRIER MATERIAL FOR THE RELEASE OF ONE OR MORE ACTIVE AGENT(S) IN A HOME CARE FORMULATION."

The present invention relates to a carrier material for the release of one or more active agent(s) in a home care formulation, a delivery system for the release of one or more active agent(s) in a home care formulation, a home care formulation comprising the delivery system for the release of one or more active agent(s), a method for preparing the delivery system for the release of one or more active agent(s) in a home care formulation as well as the use of the delivery system for the release of one or more active agent(s) in a home care formulation.

Magnesium carbonate is well known in the art and occurs naturally in a great variety of forms, such as anhydrous magnesium carbonate or magnesite ($MgCO_3$), hydromagnesite ($Mg_5(CO_3)_4(OH)_2 \cdot 4H_2O$), artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 5H_2O$), barringtonite ($MgCO_3 \cdot 2H_2O$), lansfordite ($MgCO_3 \cdot 5H_2O$) and nesquehonite ($MgCO_3 \cdot 3H_2O$).

Besides the natural magnesium carbonates, synthetic magnesium carbonates (or precipitated magnesium carbonates) can be prepared. For example, EP 0 526 121 describes a calcium-magnesium carbonate composite consisting of calcium carbonate and magnesium carbonate hydroxide and a method for the preparation thereof. Furthermore, GB 594,262 relates to a method and apparatus for treating magnesia-containing materials, such as magnesium and calcium carbonate materials for obtaining respective carbonates in discrete and separate forms, by controlled carbonation such that the magnesium and calcium carbonates may be separated by mechanical means and with attainment of special utilities in separated products.

Additionally, U.S. Pat. Nos. 1,361,324, 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite. Other processes described in the art suggest to prepare compositions containing both, hydromagnesite and magnesium hydroxide, wherein magnesium hydroxide is mixed with water to form a suspension which is further contacted with carbon dioxide and an aqueous basic solution to form the corresponding mixture; cf. for example U.S. Pat. No. 5,979,461.

Furthermore, it is well known that magnesium carbonate can be used in home care formulations. For example, U.S. Pat. No. 4,303,542 refers to a powdered detergent suitable for use in home laundry machines. The detergent contains (1) an acid component which provides an initial wash solution with a pH of 1-4 and (2) a coated alkali-supplying substance which neutralizes the acid wash solution within a period of about 2 to 25 minutes. According to the example section, a soak consists of 110 g sodium bisulfate, 20 g magnesium carbonate, 30 g non-ionic surfactants in a ratio liquid to solid of 1:3 and 13 g BW 7380.

However, there is still a need in the art for providing a carrier material which can be used in a home care formulation and specifically provides a high loading capacity together with a high release efficiency when loaded with active agent(s). There is a further need to provide liquid active agent(s) in form of dry formulations.

Accordingly, it is an objective of the present invention to provide a carrier material that is suitable for the release of active agent(s) in a home care formulation. Furthermore, it is desirable to provide a carrier material that features a high loading capacity. It is further desired to provide a carrier material that features a high release efficiency when loaded with active agent(s). It is also desired to provide a carrier material that is especially suitable for dry formulations. It is also desired to provide a method for preparing a delivery system for the release of active agent(s). Further objectives can be gathered from the following description of the invention.

The foregoing objects and other objects are solved by the subject-matter as defined herein in the independent claims.

Advantageous embodiments of the inventive use are defined in the corresponding sub-claims.

According to one aspect of the present application, a carrier material for the release of one or more active agent(s) in a home care formulation is provided, the carrier material consisting of magnesium carbonate having a specific surface area of $\geq 25$ m$^2$/g, measured using nitrogen and the BET method according to ISO 9277:2010.

The inventors surprisingly found out that the foregoing carrier material has a high loading capacity for active agent(s) together with a high release efficiency when loaded with active agent(s) and thus is highly suitable as a delivery system for the release of one or more active agent(s) in a home care formulation. More precisely, the inventors found out that loading and release characteristics for active agent(s) in a home care formulation can be improved by using a delivery system comprising a carrier material consisting of magnesium carbonate having a specific surface area of $\geq 25$ m$^2$/g, measured using nitrogen and the BET method according to ISO 9277:2010. Furthermore, the carrier material is suitable to be loaded with high quantities of liquid active agent(s) such that the obtained delivery system is also suitable for dry formulations.

According to one embodiment, the magnesium carbonate has a specific surface area in the range from 25 to 150 m$^2$/g, preferably from 35 to 120 m$^2$/g, and most preferably from 35 to 100 m$^2$/g, measured using nitrogen and the BET method according to ISO 9277:2010.

According to another embodiment, the magnesium carbonate has an intra-particle intruded specific pore volume in the range from 0.9 to 2.3 cm$^3$/g, preferably from 1.1 to 2.1 cm$^3$/g, and most preferably from 1.2 to 2.0 cm$^3$/g, calculated from mercury porosimetry measurement.

According to yet another embodiment, the magnesium carbonate has a $d_{50}$(vol) in the range from 1 to 75 μm, preferably from 1.2 to 50 μm, more preferably from 1.5 to 30 μm, even more preferably from 1.7 to 15 μm and most preferably from 1.9 to 10 μm, as determined by laser diffraction.

According to one embodiment, the magnesium carbonate has a $d_{98}$(vol) in the range from 2 to 150 μm, preferably from 4 to 100 μm, more preferably from 6 to 80 μm, even more preferably from 8 to 60 μm and most preferably from 10 to 40 μm, as determined by laser diffraction.

According to another embodiment, the magnesium carbonate contains up to 15 000 ppm $Ca^{2+}$ ions.

According to another aspect of the present invention, a delivery system for the release of one or more active agent(s) in a home care formulation is provided, the delivery system comprising the carrier material as defined herein and one or more active agent(s) which is/are loaded on the carrier material.

According to one embodiment, the one or more active agent(s) is/are adsorbed onto and/or adsorbed and/or absorbed into the carrier material.

According to another embodiment, the one or more active agent(s) is/are selected from the group of active agents mentioned in the Regulation (EC) No 648/2004 of the European Parliament and of the Council of 31 Mar. 2004 on detergents, preferably the one or more active agent(s) is/are selected from the group comprising anionic surfactants, nonionic surfactants, cationic surfactants, amphoteric surfactants, phosphates, phosphonates, softener, sequestrants, builders, processing aids, enzymes, oxygen-based bleaching agents, chlorine-based bleaching agents, anti-scaling agents, complexing agents, dispersing agents, sequestrants, nitrilotriacetic acid and salts thereof, phenols, halogenated phenols, paradichlorobenzene, aromatic hydrocarbons, aliphatic hydrocarbons, halogenated hydrocarbons, soap, zeolites, polycarboxylates, disinfectants, optical brightener, defoamers, colorants, fragrances and mixtures thereof.

According to yet another embodiment, the delivery system comprises the one or more active agent(s) in an amount ranging from 10 to 300 wt.-%, preferably from 40 to 290 wt.-%, more preferably from 60 to 280 wt.-%, and most preferably from 80 to 260 wt.-%, e.g. from 90 to 200 wt.-%, based on the total weight of the carrier material.

According to one embodiment, the delivery system is in the form of a powder, a tablet, a pellet, or granules, preferably a powder.

According to a further aspect of the present invention, a home care formulation comprising a delivery system for the release of one or more active agent(s) as defined herein is provided.

According to one embodiment, the formulation is in form of a liquid, a powder, a paste, a gel, a bar, a cake, a pouch or a moulded piece, such as a tablet.

According to another embodiment, the formulation is a washing formulation, preferably for cleaning of laundry, fabrics, dishes and hard surfaces; a pre-washing formulation; a rinsing formulation; a bleaching formulation; a laundry fabric-softener formulation; a cleaning formulation; and mixtures thereof.

According to a still further aspect of the present invention, a method for preparing a delivery system for the release of one or more active agent(s) in a home care formulation as defined herein is provided. The method comprising the steps of a) providing magnesium carbonate having a specific surface area of $\geq 25$ $m^2/g$, measured using nitrogen and the BET method according to ISO 9277:2010,
b) providing one or more active agent(s) in the form of a liquid or dissolved in a solvent, and
c) contacting the magnesium carbonate of step a) with the one or more active agent(s) of step b).

According to an even further aspect of the present invention, the use of a delivery system as defined herein for the release of one or more active agent(s) in a home care formulation is provided.

According to one embodiment, the delivery system provides a release efficiency for the one or more active agent(s) represented by the following formula (I)

$$\text{release efficiency} = 100 * \frac{m(\text{active agent released})}{m(\text{active agent loaded})} \quad (I)$$

of $\geq 50\%$, preferably $\geq 72\%$, and most preferably $\geq 80\%$.

According to another embodiment, the release efficiency is attained within a time period of 15 min, preferably within 5 min and most preferably within 1 min.

It should be understood that for the purposes of the present invention, the following terms have the following meanings:

The "specific surface area" (expressed in $m^2/g$) of a material as used throughout the present application can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 120 min prior to measurement.

Volume determined median particle size $d_{50}(vol)$ and the volume determined top cut particle size $d_{98}$ was evaluated using a Malvern Mastersizer 3000 Laser Diffraction System (Malvern Instruments Plc., Great Britain) equipped with a Hydro LV system. The $d_{50}(vol)$ or $d_{98}(vol)$ value indicates a diameter value such that 50% or 98% by volume, respectively, of the particles have a diameter of less than this value. The powders were suspended in 0.1 wt.-% $Na_4O_7P_2$ solution. 10 mL of 0.1 wt.-% $Na_4O_7P_2$ was added to the Hydro LV tank, then the sample slurry was introduced until an obscuration between 10-20% was achieved and the system was ultrasonicated at the 40% setting for 1 min. Measurements were conducted with red and blue light for 10 s each. For the analysis of the raw data, the models for non-spherical particle sizes with the Fraunhofer assumption was utilized, and a particle refractive index of 1.57, a density of 2.70 $g/cm^3$, and an absorption index of 0.005 was assumed. The methods and instruments are known to the skilled person and are commonly used to determine particle size distributions of fillers and pigments.

The specific pore volume is measured using mercury intrusion porosimetry using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 3 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 208 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

In the following preferred embodiments of the inventive carrier material will be set out in more detail. It is to be understood that these embodiments and details also apply to the inventive products, methods and uses.

Carrier Material

The carrier material for the release of one or more active agent(s) in a home care formulation consists of magnesium carbonate having a specific surface area of ≥25 m$^2$/g, measured using nitrogen and the BET method according to ISO 9277:2010.

It is appreciated that the term "magnesium carbonate" refers to a material that comprises at least 80 wt.-% magnesium carbonate, e.g. at least 85 wt.-%, preferably between 85 and 100 wt.-%, more preferably between 90 and 99.95 wt.-%, based on the total dry weight of the material. Thus, it is to be noted that the magnesium carbonate may further comprise impurities typically associated with the type of material used. For example, the magnesium carbonate may further comprise impurities such as magnesium hydroxide, calcium hydroxide, calcium carbonate and mixtures thereof. However, such impurities are present in amounts of less than 20 wt.-%, preferably less than 15 wt.-% and most preferably from 0.05 to 10 wt.-%, based on the total dry weight of the material.

The magnesium carbonate can be a naturally occurring or synthetic magnesium carbonate. For example, the magnesium carbonate encompasses naturally occurring or synthetic magnesium carbonate selected from the group comprising magnesite ($MgCO_3$), hydromagnesite ($Mg_5(CO_3)_4(OH)_2 \cdot 4H_2O$), artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), barringtonite ($MgCO_3 \cdot 2H_2O$), lansfordite ($MgCO_3 \cdot 5H_2O$), nesquehonite ($MgCO_3 \cdot 3H_2O$) and mixtures thereof.

Preferably, the magnesium carbonate encompasses synthetic magnesium carbonate selected from the group comprising magnesite ($MgCO_3$), hydromagnesite ($Mg_5(CO_3)_4(OH)_2 \cdot 4H_2O$), artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), barringtonite ($MgCO_3 \cdot 2H_2O$), lansfordite ($MgCO_3 \cdot 5H_2O$), nesquehonite ($MgCO_3 \cdot 3H_2O$) and mixtures thereof. For example, the magnesium carbonate comprises the synthetic magnesium carbonate selected from the group comprising magnesite ($MgCO_3$), hydromagnesite ($Mg_5(CO_3)_4(OH)_2 \cdot 4H_2O$), artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), barringtonite ($MgCO_3 \cdot 2H_2O$), lansfordite ($MgCO_3 \cdot 5H_2O$), nesquehonite ($MgCO_3 \cdot 3H_2O$) and mixtures thereof in an amount of at least 80 wt.-%, more preferably at least 85 wt.-%, even more preferably between 85 and 100 wt.-%, and most preferably between 90 and 99.95 wt.-%, based on the total dry weight of the material.

In one embodiment, the magnesium carbonate comprises synthetic hydromagnesite ($Mg_5(CO_3)_4(OH)_2 \cdot 4H_2O$). Preferably, the magnesium carbonate comprises synthetic hydromagnesite ($Mg_5(CO_3)_4(OH)_2 \cdot 4H_2O$) in an amount of at least 80 wt.-%, more preferably at least 85 wt.-%, even more preferably between 85 and 100 wt.-%, and most preferably between 90 and 99.95 wt.-%, based on the total dry weight of the material.

It is has been specifically found out that a carrier material having a specific surface area of ≥25 m$^2$/g, measured using nitrogen and the BET method according to ISO 9277:2010 has a high loading capacity for active agent(s) together with a high release efficiency when loaded with active agent(s). Accordingly, such carrier material is specifically suitable as delivery system for the release of one or more active agent(s) in a home care formulation.

It is thus one specific requirement of the present invention that the magnesium carbonate has a specific surface area of ≥25 m$^2$/g, measured using nitrogen and the BET method according to ISO 9277:2010. It is preferred that the magnesium carbonate has a specific surface area in the range from 25 to 150 m$^2$/g, more preferably from 35 to 120 m$^2$/g, and most preferably from 35 to 100 m$^2$/g, measured using nitrogen and the BET method according to ISO 9277:2010.

Furthermore, it is specifically advantageous if the magnesium carbonate has a high intra-particle intruded specific pore volume. For example, it is preferred that the magnesium carbonate has an intra-particle intruded specific pore volume in the range from 0.9 to 2.3 cm$^3$/g, calculated from mercury intrusion porosimetry. In one embodiment, the magnesium carbonate has an intra-particle intruded specific pore volume in the range from 1.1 to 2.1 cm$^3$/g, and most preferably from 1.2 to 2.0 cm$^3$/g, calculated from mercury intrusion porosimetry.

It has been surprisingly found out that due to the specific surface area in combination with the intra-pore structure of the magnesium carbonate, it is a superior carrier material for active agents to be loaded and to be released over time relative to common magnesium carbonates having lower specific surface areas and/or lower intra-particle pore volume. Furthermore, the specific surface area in combination with the intra-pore structure of the magnesium carbonate allows the loading of the carrier material with liquid active agent(s) such that the obtained delivery system is suitable for dry formulations.

According to one embodiment, the magnesium carbonate has
- a) a specific surface area of ≥25 m$^2$/g, preferably in the range from 25 to 150 m$^2$/g, more preferably from 35 to 120 m$^2$/g, and most preferably from 35 to 100 m$^2$/g, measured using nitrogen and the BET method according to ISO 9277:2010, and
- b) an intra-particle intruded specific pore volume in the range from 0.9 to 2.3 cm$^3$/g, preferably from 1.1 to 2.1 cm$^3$/g, and most preferably from 1.2 to 2.0 cm$^3$/g, calculated from mercury porosimetry measurement.

Preferably, the magnesium carbonate has a specific surface area in the range from 35 to 100 m$^2$/g, measured using nitrogen and the BET method according to ISO 9277:2010, and an intra-particle intruded specific pore volume in the range from 1.2 to 2.0 cm$^3$/g, calculated from mercury porosimetry measurement.

The magnesium carbonate is in the form of a particulate material, and may have a particle size distribution as conventionally employed for the material(s) involved in the type of product to be produced. In general, it is preferred that the magnesium carbonate has a $d_{50}$(vol) in the range from 1 to 75 μm, as determined by laser diffraction. For example, the magnesium carbonate has a $d_{50}$(vol) in the range from 1.2 to 50 μm, more preferably from 1.5 to 30 μm, even more preferably from 1.7 to 15 μm and most preferably from 1.9 to 10 μm, as determined by laser diffraction.

Additionally or alternatively, the magnesium carbonate has a $d_{98}$(vol) in the range from 2 to 150 μm, as determined by laser diffraction. For example, the magnesium carbonate has a $d_{98}$(vol) in the range from 4 to 100 μm, more preferably from 6 to 80 μm, even more preferably from 8 to 60 μm and most preferably from 10 to 40 μm, as determined by laser diffraction.

Thus, the magnesium carbonate preferably has a
- a) a $d_{50}$(vol) in the range from 1 to 75 μm, preferably from 1.2 to 50 μm, more preferably from 1.5 to 30 μm, even more preferably from 1.7 to 15 μm and most preferably from 1.9 to 10 μm, as determined by laser diffraction, and
- b) a $d_{98}$(vol) in the range from 2 to 150 μm, preferably from 4 to 100 μm, more preferably from 6 to 80 μm, even more preferably from 8 to 60 μm and most preferably from 10 to 40 μm, as determined by laser diffraction.

In one embodiment, the magnesium carbonate has a $d_{50}$(vol) in the range from 1.9 to 10 μm, as determined by laser diffraction, and a $d_{98}$(vol) in the range from 10 to 40 μm, as determined by laser diffraction.

In order to obtain a carrier material having a high loading capacity together with a high release efficiency when loaded with active agent(s), it is especially preferred that the magnesium carbonate has
- a) a specific surface area of ≥25 m$^2$/g, preferably in the range from 25 to 150 m$^2$/g, more preferably from 35 to 120 m$^2$/g, and most preferably from 35 to 100 m$^2$/g, measured using nitrogen and the BET method according to ISO 9277:2010, and
- b) an intra-particle intruded specific pore volume in the range from 0.9 to 2.3 cm$^3$/g, preferably from 1.1 to 2.1 cm$^3$/g, and most preferably from 1.2 to 2.0 cm$^3$/g, calculated from mercury porosimetry measurement, and
- c) a $d_{50}$(vol) in the range from 1 to 75 μm, preferably from 1.2 to 50 μm, more preferably from 1.5 to 30 μm, even more preferably from 1.7 to 15 μm and most preferably from 1.9 to 10 μm, as determined by laser diffraction, and/or
- d) a $d_{98}$(vol) in the range from 2 to 150 μm, preferably from 4 to 100 μm, more preferably from 6 to 80 μm, even more preferably from 8 to 60 μm and most preferably from 10 to 40 μm, as determined by laser diffraction.

Preferably, the magnesium carbonate has
- a) a specific surface area of ≥25 m$^2$/g, preferably in the range from 25 to 150 m$^2$/g, more preferably from 35 to 120 m$^2$/g, and most preferably from 35 to 100 m$^2$/g, measured using nitrogen and the BET method according to ISO 9277:2010, and
- b) an intra-particle intruded specific pore volume in the range from 0.9 to 2.3 cm$^3$/g, preferably from 1.1 to 2.1 cm$^3$/g, and most preferably from 1.2 to 2.0 cm$^3$/g, calculated from mercury porosimetry measurement, and
- c) a $d_{50}$(vol) in the range from 1 to 75 μm, preferably from 1.2 to 50 μm, more preferably from 1.5 to 30 μm, even more preferably from 1.7 to 15 μm and most preferably from 1.9 to 10 μm, as determined by laser diffraction, and
- d) a $d_{98}$(vol) in the range from 2 to 150 μm, preferably from 4 to 100 μm, more preferably from 6 to 80 μm, even more preferably from 8 to 60 μm and most preferably from 10 to 40 μm, as determined by laser diffraction.

In one embodiment, the magnesium carbonate has
- a) a specific surface area in the range from 35 to 100 m$^2$/g, measured using nitrogen and the BET method according to ISO 9277:2010, and
- b) an intra-particle intruded specific pore volume in the range from 1.2 to 2.0 cm$^3$/g, calculated from mercury porosimetry measurement, and
- c) a $d_{50}$(vol) in the range from 1.9 to 10 μm, as determined by laser diffraction, and
- d) a $d_{98}$(vol) in the range from 10 to 40 μm, as determined by laser diffraction.

It is one requirement that the carrier material consists of magnesium carbonate. That is to say, the carrier material contains the magnesium carbonate in an amount of at least 96.0 wt.-%, preferably between 96.0 and 100 wt.-%, more preferably between 99.0 and 99.99 wt.-%, and most preferably between 99.3 and 99.8 wt.-%, based on the total dry weight of the carrier material.

In one embodiment, the magnesium carbonate contains up to 15 000 ppm Ca$^{2+}$ ions. For example, the magnesium carbonate contains up to 10 000 ppm, more preferably up to 5 000 ppm and most preferably up to 2 000 ppm Ca$^{2+}$ ions.

Depending on the magnesium carbonate, the magnesium carbonate preferably has a residual total moisture content of from 0.01 to 20 wt.-%, preferably from 0.01 to 15 wt.-%, more preferably from 0.02 to 12 wt.-% and most preferably from 0.04 to 10 wt.-%, based on the total dry weight of the magnesium carbonate. It is appreciated that the total moisture content includes crystal water as well as free water.

Delivery System

According to a further aspect, a delivery system for the release of one or more active agent(s) in a home care formulation is provided. It is required that the delivery system comprises the carrier material as defined herein and one or more active agent(s) which is/are loaded on the carrier material.

With regard to the definition of the carrier material and preferred embodiments thereof, reference is made to the statements provided above when discussing the technical details of the carrier material of the present invention.

The delivery system for the release of one or more active agent(s) in a home care formulation thus comprises
 a) a carrier material consisting of magnesium carbonate having a specific surface area of $\geq 25$ m$^2$/g, measured using nitrogen and the BET method according to ISO 9277:2010, and
 b) one or more active agent(s) which is/are loaded on the carrier material.

Thus, one requirement of the present invention is that one or more active agent(s) is/are loaded on the carrier material.

It is appreciated that the one or more active agent(s) can be one kind of active agent. Alternatively, the one or more active agent(s) can be a mixture of two or more kinds of active agents. For example, the one or more active agent(s) can be a mixture of two or three kinds of active agents, like two kinds of active agents.

In one embodiment of the present invention, the one or more active agent(s) is one kind of active agent.

The term "active agent" in the meaning of the present invention refers to a substance having a specific effect in home care formulations.

In general, the one or more active agent(s) can be any kind of active agent known for home care formulations. For example, the one or more active agent(s) is/are selected from the group of active agents mentioned in the Regulation (EC) No 648/2004 of the European Parliament and of the Council of 31 Mar. 2004 on detergents.

In one embodiment, the one or more active agent(s) is/are selected from the group comprising anionic surfactants, nonionic surfactants, cationic surfactants, amphoteric surfactants, phosphates, phosphonates, softener, sequestrants, builders, processing aids, enzymes, oxygen-based bleaching agents, chlorine-based bleaching agents, anti-scaling agents, complexing agents, dispersing agents, sequestrants, nitrilotriacetic acid and salts thereof, phenols, halogenated phenols, paradichlorobenzene, aromatic hydrocarbons, aliphatic hydrocarbons, halogenated hydrocarbons, soap, zeolites, polycarboxylates, disinfectants, optical brightener, defoamers, colorants, fragrances and mixtures thereof. Preferably, the one or more active agent(s) is/are selected from the group comprising anionic surfactants, nonionic surfactants, cationic surfactants, amphoteric surfactants, phosphates, phosphonates and mixtures thereof. More preferably, the one or more active agent(s) is/are selected from the group comprising anionic surfactants, nonionic surfactants, cationic surfactants, amphoteric surfactants and mixtures thereof. That is to say, the one or more active agent(s) is/are preferably selected from surfactants.

It is appreciated that the term "surfactant" means any substance and/or mixture of substances which has surface-active properties and which consists of one or more hydrophilic, and one or more hydrophobic groups of such a nature and size that it is capable of reducing the surface tension of water, and of forming spreading or adsorption monolayers at the water-air interface, and of forming emulsions and/or microemulsions and/or micelles, and of adsorption at water-solid interfaces.

Anionic surfactants suitable for the home care formulation can be any anionic surfactant known for the kind of formulation to be prepared. For example, the anionic surfactant is selected from the group comprising alkane sulfonates, olefin sulfonates, fatty acid ester sulfonates, such as methyl or ethyl ester sulfonates, alkyl phosphonates, alkyl ether phosphonates, taurates, alkyl ether carboxylates, $C_8$-$C_{22}$ alkyl sulfates, $C_8$-$C_{22}$ alkylbenzene sulfates and salts thereof, $C_8$-$C_{22}$ alkyl alkoxy sulfates and salts thereof, such as sodium lauryl ether sulfate, $C_{12}$-$C_{22}$ methyl ester sulfonates and salts thereof, $C_{12}$-$C_{22}$ alkylbenzene sulfonates and salts thereof, such as sodium dodecylbenzenesulfonate, $C_{12}$-$C_{22}$ fatty acid soaps and salts thereof and mixtures thereof.

Nonionic surfactants suitable for the home care formulation can be any nonionic surfactant known for the kind of formulation to be prepared. For example, the nonionic surfactant is selected from the group comprising $C_8$-$C_{22}$ alkyl ethoxylates, $C_6$-$C_{12}$ alkyl phenol alkoxylates, alkylpolysaccharides, alkyl polyglucoside surfactants, glucamides, methylesteralkoxylates, alkoxylated alcohols, such as alkoxylated $C_{12}$-$C_{22}$ alcohols, fatty alcohol alkoxylates, optionally modified fatty alcohol alkoxylates, ethoxylated or propoxylated sorbitan esters, polyhydroxy fatty acid amides, rhamnolipids, glucoselipids, lipopeptides and mixtures thereof.

Cationic surfactants suitable for the home care formulation can be any cationic surfactant known for the kind of formulation to be prepared. For example, useful cationic surfactants can be selected from fatty amines, quaternary ammonium surfactants, esterquats, i.e. quaternized fatty acid surfactants, and mixtures thereof.

Amphoteric surfactants suitable for the home care formulation can be any amphoteric surfactant known for the kind of formulation to be prepared. For example, the amphoteric surfactants can be selected from aliphatic derivatives of secondary or tertiary amines and/or aliphatic derivatives of heterocyclic secondary and tertiary amines in which the aliphatic radical can be a straight- or branched-chain.

In one embodiment, the one or more active agent(s) is/are a softener well known in the art. For example, the softener is a sodium salt of a copolymer from maleic acid and acrylic acid.

In an alternative embodiment, the one or more active agent(s) is/are an anti-scaling agent well known in the art. For example, the anti-scaling agent is a sodium salt of an acrylic acid homopolymer.

In an alternative embodiment, the one or more active agent(s) is/are a complexing agent well known in the art. For example, the complexing agent is selected from the group comprising tetrasodium etidronate ($Na_4HEDP$), ethylenediaminetetraacetic acid (EDTA) and mixtures thereof.

In an alternative embodiment, the one or more active agent(s) is/are a sequestrant well known in the art. For example, the sequestrant is selected from the group comprising sodium methylglycine diacetate, tetrasodium etidronate ($Na_4HEDP$), ethylenediaminetetraacetic acid (EDTA) and mixtures thereof.

It is appreciated that the one or more active agent(s) added to the home care formulation may have different functions. For example, if sodium methylglycine diacetate is added to the home care formulation, it may also function as builder.

In an alternative embodiment, the one or more active agent(s) is/are a dispersing agent well known in the art. For example, the dispersing agent can be a polyethylene glycol, such as a polyethylene glycol having a molar mass from 2 000 to 10 000 g/mol, preferably of about 4 000 g/mol.

The home care formulation may also comprise enzymes. Suitable enzymes for the home care formulation can be any enzyme known for the kind of formulation to be prepared. For example, suitable enzymes are selected from the group comprising hemicellulases, peroxidases, proteases, lipases, phospholipases, esterases, reductases, oxidases, oxygenases, lipoxygenases, haloperoxidases, amylases and mixtures thereof.

Optical brighteners for the home care formulation can be any optical brightener known for the kind of formulation to be prepared. Examples of suitable optical brighteners include derivatives of stilbene or 4,4'-diaminostilbene, biphenyl, five-membered heterocycles such as triazoles, oxazoles, imidiazoles, and the like, or six-membered heterocycles such as coumarins, naphthalamide, s-triazine, and the like.

There are, however, some limitations, which therefore are excluded from the subject-matter of the present invention. Thus, active agent(s) reacting with the carrier material such as acidic agents sometimes are not suitable to be loaded on the carrier material. On the other hand, even acidic agents may be advantageously used, e.g., if the magnesium salt of the acidic agent is required or beneficial. A certain level of acidity can also enhance loading on the surface of the carrier material.

The one or more active agent(s) is/are loaded on the carrier material as defined herein. The loading is preferably an adsorption onto the surface of the carrier material, be it the outer or the inner surface of the material or an absorption into the carrier material, which is possible due to its porosity.

In this respect, it is believed that because of the advantageous high specific surface area in combination with a high intra-particle intruded specific pore volume of the magnesium carbonate, this material is a superior carrier material to release previously loaded active agent(s) over time relative to common carrier materials having lower specific surface areas and/or intra-particle intruded specific pore volume.

Thus, it is appreciated that the one or more active agent(s) is/are adsorbed onto and/or adsorbed and/or absorbed into the carrier material.

As already mentioned, the delivery system comprises the carrier material as defined herein and one or more active agent(s) which is/are loaded on the carrier material.

The amount of the one or more active agent(s) which is/are loaded on the carrier material depends on the active agent(s) and the intended use. Generally, the delivery system comprises the one or more active agent(s) in an amount ranging from 10 to 300 wt.-%, based on the total weight of the carrier material.

For example, the delivery system comprises the one or more active agent(s) in an amount ranging from 40 to 290 wt.-%, more preferably from 60 to 280 wt.-%, and most preferably from 80 to 260 wt.-%, based on the total weight of the carrier material.

It is preferred that the delivery system comprises the one or more active agent(s) in an amount ranging from 90 to 200 wt.-%, based on the total weight of the carrier material.

The delivery system can be provided in any form that is conventionally employed for the material(s) involved in the type of product to be produced. It is appreciated that the carrier material is in the form of a particulate material. The term "particulate" in the meaning of the present application refers to a material which is composed of a plurality of particles.

Thus, the delivery system is preferably in the form of a powder, a tablet, a pellet, or granules. More preferably, the delivery system is in the form of a powder. Such forms and methods for their preparation are well known in the art and do not need to be described in more detail in the present application.

Home Care Formulation

According to another aspect, a home care formulation is provided. It is required that the home care formulation comprises a delivery system for the release of one or more active agent(s) as defined herein.

With regard to the definition of the delivery system and preferred embodiments thereof, reference is made to the statements provided above when discussing the technical details of the delivery system of the present invention.

One requirement of the present invention is that the home care formulation comprises the delivery system as defined herein.

The home care formulation thus comprises a delivery system for the release of one or more active agent(s) in a home care formulation, the carrier comprising
  a) a carrier material consisting of magnesium carbonate having a specific surface area of $\geq 25$ m$^2$/g, measured using nitrogen and the BET method according to ISO 9277:2010, and
  b) one or more active agent(s) which is/are loaded on the carrier material.

The home care formulation may be in any form known for the formulations to be prepared. For example, the home care formulation is in form of a liquid, a powder, a paste, a gel, a bar, a cake, a pouch or a moulded piece, such as a tablet.

Thus, the home care formulation can be a dry or pourable liquid formulation.

The term "dry" formulation in the meaning of the present invention refers to a formulation that is a pourable solid at 23° C. and 1 bar. Thus, a dry home care formulation is preferably in the form of a powder, a bar, a cake or a moulded piece, e.g. a tablet.

The moulded piece may have any shape or form suitable for use in the kind of formulations to be prepared. For example, the moulded piece may be a tablet.

It is appreciated that the delivery system of the present invention may be loaded with one or more active agent(s) which is/are liquid, e.g. liquid surfactants, and thus forms a delivery system containing liquid active agent(s) inside its pores. Thus, the home care formulation can be advantageously provided as a dry formulation although the one or more active agent(s) which is/are liquid are typically not suitable for dry formulations.

The term "pourable liquid" formulation in the meaning of the present invention refers to a non-gaseous fluid composition, which is readily pourable at 23° C. and 1 bar. Preferably, the pourable liquid formulation has a Brookfield viscosity of less than 10 000 mPa·s at 23° C. For example, the pourable liquid formulation has a Brookfield viscosity in the range from 100 to 10 000 mPa·s at 23° C.

The Brookfield viscosity as used herein and as generally defined in the art is measured by using a DV III Ultra model Brookfield viscometer equipped with the disc spindle 3 at a rotation speed of 100 rpm and room temperature (23±1° C.) after stirring for one minute.

Thus, a pourable liquid home care formulation is preferably in the form of a liquid, a paste or a gel. That is to say, the delivery system is preferably provided in a solvent, especially water, to form the pourable liquid home care formulation.

In general, a "liquid" formulation refers to a formulation having a Brookfield viscosity of <2 000 mPa·s at 23° C. For example, the formulation in form of a liquid has a viscosity in the range of from 100 to <2 000 mPa·s, preferably from 150 to 1 500 mPa·s and most preferably from 200 to 1 000 mPa·s, at 23° C.

A "gel" or "paste" refers to a formulation having a Brookfield viscosity of >2 000 mPa·s at 23° C. For example, the liquid formulation in form of a paste refers to an opaque formulation having a Brookfield viscosity in the range from >2 000 to 10 000 mPa·s, preferably from 3 000 to 10 000 mPa·s preferably from 5 000 to 10 000 mPa·s at 23° C.

Preferably, the home care formulation is in form of a pourable liquid formulation.

The home care formulation, preferably the pourable liquid formulation, can be also in the form of a pouch. That is to say, the home care formulation can be filled in a polymer bag, such as a polyethylene, polypropylene, polyethylene/polypropylene, polyvinylalcohol, polyvinylalcohol derivatives or polyethylene terephthalate bag. Preferably, the home care formulation is filled in a polymer bag made from polyvinylalcohols or polyvinylalcohol derivatives. Examples of polyvinylalcohols or polyvinylalcohol derivatives include, but are not limited to, polyvinyl acetate or ethoxylated polyvinyl alcohol.

The home care formulation is preferably in form of a single dose formulation.

Additionally or alternatively, the home care formulation is a high concentrated home care formulation, such as a high concentrated powder formulation.

The home care formulation comprises the delivery system for the release of one or more active agent(s) preferably in an amount ranging from 0.1 to 99.0 wt.-%, preferably from 0.1 to 80.0 wt.-%, more preferably from 0.5 to 60.0 wt.-% and most preferably from 1.0 to 40.0 wt.-%, based on the total weight of the home care formulation.

It is appreciated that the home care formulation may further comprise additives typically used in the kind of formulation to be prepared.

The term "home care formulation" refers to a formulation that is intended for any washing and cleaning process and used in household applications.

The home care formulation can be a washing formulation, preferably for cleaning of laundry, fabrics, dishes and hard surfaces; a pre-washing formulation; a rinsing formulation; a bleaching formulation; a laundry fabric-softener formulation; a cleaning formulation; and mixtures thereof.

The term "washing" in the meaning of the present invention preferably refers to the cleaning of laundry, fabrics, dishes and hard surfaces.

The term "cleaning" has the meaning defined by EN ISO 862.

The term "pre-washing" in the meaning of the present invention preferably refers to the soaking of fabrics, such as clothes, household linen and the like.

The term "rinsing" in the meaning of the present invention refers to the removal of water-soluble or water-insoluble substances, such as surfactants, by applying excessive amounts of water.

The term "bleaching" in the meaning of the present invention refers to the oxidative or reductive bleaching and optical whitening of a fabric.

The term "laundry fabric-softener" in the meaning of the present invention preferably refers to the feel modification of fabrics in processes complementing the washing of fabrics.

Methods and Uses

In a further aspect, the present invention refers to a method for preparing a delivery system for the release of one or more active agent(s) in a home care formulation.

The method for preparing a delivery system for the release of one or more active agent(s) in a home care formulation comprises the steps of
 a) providing magnesium carbonate having a specific surface area of ≥25 m²/g, measured using nitrogen and the BET method according to ISO 9277:2010,
 b) providing one or more active agent(s) in the form of a liquid or dissolved in a solvent, and
 c) contacting the magnesium carbonate of step a) with the one or more active agent(s) of step b).

With regard to the definition of the delivery system, the magnesium carbonate and preferred embodiments thereof, reference is made to the statements provided above when discussing the technical details of the carrier material and the delivery system of the present invention.

The magnesium carbonate may be provided in any suitable liquid or dry form in step a). For example, the magnesium carbonate may be in form of a powder and/or a suspension. The suspension can be obtained by mixing the magnesium carbonate with a solvent, preferably water. The magnesium carbonate to be mixed with a solvent, and preferably water, may be provided in any form, for example, as suspension, slurry, dispersion, paste, powder, a moist filter cake or in pressed or granulated form.

In order to obtain a high loading of the one or more active agent(s) on the carrier material, it is advantageous to provide the magnesium carbonate as concentrated as possible, i.e. the water content should be as low as possible. Thus, the magnesium carbonate is preferably provided in dry from, i.e. as a powder.

In case the magnesium carbonate is provided in dry form, the moisture content of the magnesium carbonate can be between 0.01 and 20 wt.-%, based on the total weight of the magnesium carbonate. The moisture content of the magnesium carbonate can be, for example, in the range from 0.01 to 15 wt.-%, based on the total weight of the magnesium carbonate, preferably in the range from 0.02 to 12 wt.-%, and more preferably in the range from 0.04 to 10 wt.-%.

According to step b) of the present method, the one or more active agent(s) is/are provided in the form of a liquid or dissolved in a solvent.

That is to say, in one embodiment the one or more active agent(s) is/are in the form of a liquid. The term "liquid" with regard to the one or more active agent(s) refers to non-gaseous fluid active agent(s), which is/are readily flowable at the pressure conditions and temperature of use, i.e. the pressure and temperature at which the method, preferably method step c), is carried out.

Thus, it is appreciated that the one or more active agent(s) can be liquid in a temperature range from 5 to 200° C., preferably from 10 to 120° C. and most preferably from 10 to 100° C. For example, the one or more active agent(s) can be liquid in a temperature range from 5 to 200° C., preferably from 10 to 120° C. and most preferably from 10 to 100° C. at ambient pressure conditions, i.e. at atmospheric pressure. Alternatively, the one or more active agent(s) can be liquid in a temperature range from 5 to 200° C., preferably from 10 to 120° C. and most preferably from 10 to 100° C. at reduced pressure conditions, e.g. a pressure of from 100 to 700 mbar.

Alternatively, the one or more active agent(s) is/are dissolved in a solvent. That is to say, the one or more active agent(s) and the solvent form a system in which no discrete solid particles are observed in the solvent and thus form a "solution".

In one embodiment of the present invention, the solvent is selected from the group comprising water, methanol, ethanol, n-butanol, isopropanol, n-propanol, acetone, dimethylsulphoxide, dimethylformamide, tetrahydrofurane, vegetable oils and the derivatives thereof, animal oils and the derivatives thereof, molten fats and waxes, and mixtures thereof. Preferably, the solvent is selected from water, alkanes, esters, ethers, alcohols, such as ethanol, ethylene glycol and glycerol, and/or ketones, such as acetone. More preferably, the solvent is water.

The contacting of the magnesium carbonate of step a) with the one or more active agent(s) of step b) may be carried out in any manner known by the skilled person. The contacting is preferably carried out under mixing. The mixing may be carried out under conventional mixing conditions. The skilled person will adapt these mixing conditions (such as the configuration of mixing pallets and mixing speed) according to his process equipment. It is appreciated that any mixing method which would be suitable to form the delivery system may be used.

It is appreciated that the magnesium carbonate of step a) is loaded with the one or more active agent(s) of step b) by contacting step c) to form the delivery system.

The loading may be achieved by adding the one or more active agent(s) to the dry magnesium carbonate.

According to the present invention, the magnesium carbonate is defined to be loaded, if the specific surface area is at least partially covered and/or the intra-particle pore volume of same is at least partially filled by the one or more active agent(s), and if present, the solvent in which the one or more active agent(s) is/are dissolved. For example, the magnesium carbonate is loaded, if the specific surface area is at least partially covered and/or the intra-particle pore volume of same is at least partially filled by at least 10 wt.-%, preferably at least 40 wt. %, more preferably at least 60 wt. %, and most preferably at least 80 wt. %, e.g. at least 90 wt. %, based on the total weight of the magnesium carbonate, with the one or more active agent(s), and if present, the solvent in which the one or more active agent(s) is/are dissolved. Preferably, the magnesium carbonate is loaded, if the specific surface area is at least partially covered and/or the intra-particle pore volume of same is at least partially filler by 10 to 300 wt.-%, more preferably from 40 to 290 wt.-%, even more preferably from 60 to 280 wt.-%, and most preferably from 80 to 260 wt.-%, e.g. from 90 to 200 wt.-%, based on the total weight of the magnesium carbonate, with the one or more active agent(s), and if present, the solvent in which the one or more active agent(s) is/are dissolved.

It is appreciated that method step c) can be carried out over a broad temperature and/or pressure range, provided that the one or more active agent(s) is/are in liquid form. For example, method step c) is carried out in a temperature range from 5 to 200° C., preferably from 10 to 120° C. and most preferably from 10 to 100° C. at ambient pressure conditions, i.e. at atmospheric pressure. Alternatively, method step c) is carried out in a temperature range from 5 to 200° C., preferably from 10 to 120° C. and most preferably from 10 to 100° C. at reduced pressure conditions, e.g. a pressure of from 100 to 700 mbar.

In one embodiment, method step c) is carried out at ambient temperature and pressure conditions, e.g., at room temperature, such as from about 5 to 35° C., preferably from 10 to 30° C. and most preferably from 15 to 25° C., and at atmospheric pressure. This embodiment preferably applies in case the one or more active agent(s) is/are liquid at room temperature or are dissolved in a solvent.

In case the one or more active agent(s) is/are dissolved in a solvent, the solvent is preferably removed after method step c), e.g. by evaporation. In this embodiment, the method thus preferably comprises a further step of separating the prepared delivery system from the excess solvent.

The solvent is preferably removed by means of separating the solvent from the loaded magnesium carbonate. This is preferably achieved by drying by means selected from the group comprising drying in a rotational oven, jet-drying, fluidized bed drying, freeze drying, flash drying, spray drying and temperature-controlled high or low shear mixer.

The delivery system according to the present invention may thus be produced by a method comprising the following steps:
a) providing magnesium carbonate having a specific surface area of ≥25 $m^2/g$, measured using nitrogen and the BET method according to ISO 9277:2010,
b) providing one or more active agent(s) dissolved in a solvent,
c) contacting the magnesium carbonate of step a) with the one or more active agent(s) of step b), and
d) separating the delivery system formed in step c) from the excess solvent.

The method may further comprise an optional step e) of granulating the mixture obtained in step c) or optional step d) for obtaining tablets, pellets or granules of the desired form and size.

The granulation equipment may be selected from the conventionally used ones for granulation purposes. Thus, the granulation device may be selected from the group comprising Eirich mixers, fluidized bed dryers/granulators, plate granulators, table granulators, drum granulators, disc granulators, dish granulators, ploughshare mixer, vertical or horizontal mixers, high or low shear mixer, high speed blenders, roller compactor and rapid mixer granulators.

It might be noted that there may be differences as regards the granule sizes or granule size distributions to be achieved depending on the method used.

For example, the use of a fluidized bed mixer for granulation appears to provide a more uniform granule size distribution than the Lodige mixer, whereas the Lodige mixer gives a wider size distribution. Thus, multiple size ranges may be provided.

In one embodiment, the method for preparing a delivery system for the release of one or more active agent(s) in a home care formulation comprises the steps of
a) providing magnesium carbonate having a specific surface area of ≥25 $m^2/g$, measured using nitrogen and the BET method according to ISO 9277:2010,
b) providing one or more active agent(s) in the form of a liquid or dissolved in a solvent,
c) contacting the magnesium carbonate of step a) with the one or more active agent(s) of step b),
d) optionally separating the delivery system formed in step c) from the excess solvent, and e) granulating the delivery system formed in step c) or optional step d) for obtaining tablets, pellets or granules.

It is appreciated that the carrier material has a high loading capacity for active agent(s) together with a high release efficiency when loaded with active agent(s). Thus, the loading and especially the release characteristics for active agent(s) in a home care formulation can be improved by using a delivery system comprising a carrier material being magnesium carbonate having a specific surface area of $\geq 25$ m$^2$/g, measured using nitrogen and the BET method according to ISO 9277:2010.

In another aspect, the present inventions thus refers to the use of the delivery system as defined herein for the release of one or more active agent(s) in a home care formulation.

With regard to the definition of the delivery system and preferred embodiments thereof, reference is made to the statements provided above when discussing the technical details of the delivery system of the present invention.

In particular, it is referred to the use of a delivery system for the release of one or more active agent(s) in a home care formulation, wherein the delivery system comprises a) a carrier material consisting of magnesium carbonate having a specific surface area of $\geq 25$ m$^2$/g, measured using nitrogen and the BET method according to ISO 9277:2010, and b) one or more active agent(s) which is/are loaded on the carrier material.

It is appreciated that the delivery system provides a release efficiency for the one or more active agent(s) represented by the following formula (I)

$$\text{release efficiency} = 100 * \frac{m(\text{active agent released})}{m(\text{active agent loaded})} \quad (I)$$

of $\geq 50\%$.

Preferably, the delivery system provides a release efficiency for the one or more active agent(s) represented by the formula (I) of $\geq 72\%$, and most preferably $\geq 80\%$.

It is preferred that the release efficiency is attained within a time period of 15 min, preferably within 5 min and most preferably within 1 min.

The following examples may additionally illustrate the invention but are not meant to restrict the invention to the exemplified embodiments. The examples below show the release of one or more active agent(s) in a home care formulation of a delivery system comprising a carrier material consisting of magnesium carbonate having a specific surface area of $\geq 25$ m$^2$/g, measured using nitrogen and the BET method according to ISO 9277:2010 and its improved release efficiency for the one or more active agent(s).

EXAMPLES

In the following, measurement methods implemented in the examples are described.

Particle Size Distribution

Volume determined median particle size $d_{50}$(vol) and the volume determined top cut particle size $d_{98}$(vol) was evaluated using a Malvern Mastersizer 3000 Laser Diffraction System (Malvern Instruments Plc., Great Britain) equipped with a Hydro LV system. The $d_{50}$(vol) or $d_{98}$(vol) value indicates a diameter value such that 50% or 98% by volume, respectively, of the particles have a diameter of less than this value. The powders were suspended in 0.1 wt.-% Na$_4$O$_7$P$_2$ solution. 10 mL of 0.1 wt.-% Na$_4$O$_7$P$_2$ was added to the Hydro LV tank, then the sample slurry was introduced until an obscuration between 10-20% was achieved and the system was ultrasonicated at the 40% setting for 1 min. Measurements were conducted with red and blue light for 10 s each. For the analysis of the raw data, the models for non-spherical particle sizes with the Fraunhofer assumption was utilized, and a particle refractive index of 1.57, a density of 2.70 g/cm$^3$, and an absorption index of 0.005 was assumed. The methods and instruments are known to the skilled person and are commonly used to determine particle size distributions of fillers and pigments.

Specific Surface Area (SSA)

The specific surface area was measured via the BET method according to ISO 9277:201 using nitrogen as adsorbing gas on a Micromeritics ASAP 2460 instrument from Micromeritics. The samples were pretreated in vacuum (10$^{-5}$ bar) by heating at 100° C. for a period of 120 min prior to measurement.

Intra-Particle Intruded Specific Pore Volume (in Cm$^3$/g)

The specific pore volume was measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step was 20 seconds. The sample material was sealed in a 3 cm$^3$ chamber powder penetrometer for analysis. The data were corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 208 μm down to about 1-4 μm showing the coarse packing of the sample between any agglomerate structures contributing strongly. Below these diameters lies the fine inter-particle packing of the particles themselves. If they also have intra-particle pores, then this region appears bi-modal, and by taking the specific pore volume intruded by mercury into pores finer than the modal turning point, i.e. finer than the bi-modal point of inflection, the specific intra-particle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the inter-particle pore region and the intra-particle pore region, if present. Knowing the intra-particle pore diameter range it is possible to subtract the remainder inter-particle and inter-agglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Chemical Oxygen Demand Analysis

For chemical oxygen demand (COD) analysis, suspensions were filtered (Chromafil® Xtra RC-20/25 syringe filter) and adequately diluted for the analysis. Active concentrations were determined using a cell test (according to ISO 15705; Spectroquant® for non Merck photometers; 0-1500 mg L$^{-1}$) in an Aqualytics COD250 vario photometer. For each sample, 5 readings were taken and the result averaged. The concentration of the samples was calculated based on a calibration curve with previously prepared standard solutions.

1. Carrier Materials

PHM-A and PHM-B are precipitated hydromagnesites produced by Omya International AG based on published protocols (see e.g. M. Pohl, C. Rainer, M. Esser; Omya Development AG, EP2322581 (A1)). MgCO$_3$ light (Magnesium carbonate, light) and MgCO$_3$, heavy (Magnesium carbonate, heavy) were purchased from Sigma-Aldrich. Dolomite (Microdol® 200 KN) is a natural Dolomite supplied by Omya International AG.

TABLE 1

Properties of used carrier materials

| Products | $d_{50}$(vol) (µm) | $d_{98}$(vol) (µm) | SSA (m$^2$/g) | Intra-particle intruded specific pore volume (cm$^3$/g) |
|---|---|---|---|---|
| PHM-A | 8.4 | 91.3 | 58.8 | 1.293 |
| PHM-B | 22 | 63 | 39.5 | 1.711 |
| MgCO$_3$, light | 9.8 | 30 | 33.3 | 1.069 |
| MgCO$_3$, heavy | 27 | 76 | 16.5 | 0.610 |
| Dolomite | 2.2 | 9.8 | 5.00 | 0.00 |

2. Other Materials—Tradenames/Suppliers

TABLE 2

List of active agents utilized for the loading trials

| Trade name | Characterization | Role | CAS Registry | Suppliers |
|---|---|---|---|---|
| Hoesch AE 50 | sodium dodecylbenzenesulfonate solution (50 wt. %) | Anionic surfactant | 25155-30-0 | 1) |
| Sokalan CP 5 | copolymer from maleic acid and acrylic acid, sodium salt | Softener | 52255-49-9 | 2) |
| Sokalan PA 25 | acrylic acid homopolymer, sodium salt (50 wt. %) | Anti-scaling agent | 68479-09-4 | 2) |
| Na$_4$HEDP | tetrasodium etidronate | Complexing agent | 3794-83-0 | 3) |
| Lutensol AO 3 | alkoxylated C12-15 alcohols | Nonionic surfactant | 68002-97-1 | 2) |
| Plurafac LF 731 | modified fatty alcohol alkoxylate, in water, predominantly unbranched fatty alcohols | Nonionic surfactant | not available | 2) |
| Trilon M | sodium methylglycine diacetate | Builder Sequestrant | 164462-16-2 | 4) |
| Pluriol E 4000 | Polyethylene glycol, molar mass ca. 4000 g/mol | Dispersant | 25322-68-3 | 2) |

1) Hoesch
2) BASF
3) Biesterfeld
4) Coatex

3. Loading of the Carrier Materials

For loading experiments, 10 g of the carrier material was weighed into a beaker and mechanically stirred. Then, the desired amount of active solution was added drop-wise using a pipette. Solid actives were dissolved in water at a suitable concentration before the loading procedure. The nominal loading of actives was calculated according to equation (1).

$$\text{Loading } [\%] = \frac{\text{mass of surfactant [g]}}{\text{mass of powder [g]}} \cdot 100 \quad (I)$$

TABLE 3

Preparation of delivery systems

| Trial | Carrier material | Active agent | Loading (%) |
|---|---|---|---|
| A.1 | PHM-A | Hoesch AE 50 | 100 |
| A.2 | PHM-A | Plurafac LF 731 | 100 |
| A.3 | PHM-A | Lutensol AO 3 | 100 |
| A.4 | PHM-A | HEDP | 100 |
| A.5 | PHM-A | Pluriol E 4000 | 100 |
| A.6 | PHM-A | Trilon M | 100 |
| B.1 | PHM-B | Hoesch AE 50 | 150 |
| B.2 | PHM-B | Hoesch AE 50 | 125 |
| B.3 | PHM-B | Hoesch AE 50 | 100 |
| B.4 | PHM-B | Plurafac LF 731 | 150 |
| B.5 | PHM-B | Plurafac LF 731 | 125 |
| B.6 | PHM-B | Lutensol AO 3 | 150 |
| B.7 | PHM-B | HEDP | 150 |
| B.8 | PHM-B | Pluriol E 4000 | 150 |
| B.9 | PHM-B | Trilon M | 150 |
| C.1 | MgCO$_3$, light | Plurafac LF 731 | 100 |
| D.1 (comparative) | MgCO$_3$, heavy | Plurafac LF 731 | 20 |
| E.1 (comparative) | Dolomite | Plurafac LF 731 | 1 |

Comparison of the data in Tables 1 and 3 evidences that carrier materials providing a high BET surface (≥25 m$^2$/g) optionally in combination with a high intra-particle intruded specific pore volume (≥0.9 cm$^3$/g) can accommodate higher loadings of actives (≥100%) compared to their counterparts having lower surface areas or porosity (Experiments D.1 and E.1). This translates into a technical advantage, as the quantity of carrier material required to convey a specific quantity of an active agent is reduced.

4. Release Trials with the Loaded Carrier Materials (Delivery Systems)

For release trials, the amount of active-loaded carrier materials required to achieve the indicated concentration was dispersed in 1 L demineralized water for 10 min at room temperature. Subsequently, an aliquot was taken and the concentration of the active was determined by COD analysis as detailed above. The release efficiency was calculated according to equation (II).

$$\text{Release efficiency [\%]} = \frac{\text{concentration of active in solution [g L}^{-1}\text{]}}{\text{concentration of active introduced [g L}^{-1}\text{]}} \cdot 100 \qquad \text{(II)}$$

TABLE 5

Release trials conducted with loaded carrier materials

| Trial | Loaded carrier material | Active concentration (g L$^{-1}$) | Release efficiency (%) |
|---|---|---|---|
| A.A | A.1 | 0.63 | 48.8 |
| A.B | A.2 | 0.25 | 73.2 |
| A.C | A.3 | 0.53 | 63.4 |
| A.D | A.4 | 0.063 | 96.2 |
| A.E | A.5 | 0.063 | 90.1 |
| A.F | A.6 | 2.0 | 98.3 |
| B.A | B.1 | 0.63 | 80.7 |
| B.B | B.2 | 0.63 | 75.9 |
| B.C | B.3 | 0.63 | 74.9 |
| B.D | B.4 | 0.25 | 87.1 |
| B.E | B.5 | 0.25 | 93.2 |
| B.F | B.6 | 0.53 | 81.7 |
| B.G | B.7 | 0.063 | 90.8 |
| B.H | B.8 | 0.063 | 104 |
| B.I | B.9 | 2.0 | 98.6 |
| C.A | C.1 | 0.25 | 58.9 |
| D.A (comparative) | D.1 | 0.25 | 71.0 |
| E.A (comparative) | E.1 | 0.25 | 36.1 |

Comparison of the data in Tables 1 and 5 evidences that carrier materials providing a high BET surface ($\geq 25$ m$^2$/g) optionally in combination with a high intra-particle intruded specific pore volume ($\geq 0.9$ cm$^3$/g) can attain higher release efficiencies compared to their counterparts having lower surface areas or porosity (Experiment E.1). This translates into a technical advantage, as the quantity of active agent required to convey a specific concentration of active is reduced.

The invention claimed is:

1. A delivery system for the release of one or more active agent(s) in a home care formulation, the delivery system comprising a carrier material and one or more active agent(s) which is loaded on the carrier material,
wherein
the carrier material consists of magnesium carbonate having a specific surface area of from 25 to 150 m$^2$/g, measured using nitrogen and the BET method according to ISO 9277:2010, and wherein the magnesium carbonate comprises synthetic hydromagnesite (Mg$_5$(CO$_3$)$_4$(OH)$_2$·4H$_2$O),
the delivery system comprises the one or more active agent(s) in an amount ranging from 80 to 260 wt.-%, based on the total weight of the carrier material, and
the delivery system provides a release efficiency for the one or more active agent(s) represented by the following formula (I)

$$\text{release efficiency} = 100 * \frac{m(\text{active agent released})}{m(\text{active agent loaded})} \qquad \text{(I)}$$

of $\geq 63.4\%$.

2. The delivery system according to claim 1, wherein the one or more active agent(s) is/are adsorbed onto and/or adsorbed and/or absorbed into the carrier material.

3. The delivery system according to claim 1, wherein the one or more active agent(s) is/are selected from the group of active agents mentioned in the Regulation (EC) No 648/2004 of the European Parliament and of the Council of 31 Mar. 2004 on detergents, anionic surfactants, nonionic surfactants, cationic surfactants, amphoteric surfactants, phosphates, phosphonates, softener, sequestrants, builders, processing aids, enzymes, oxygen-based bleaching agents, chlorine-based bleaching agents, anti-scaling agents, complexing agents, dispersing agents, sequestrants, nitrilotriacetic acid and salts thereof, phenols, halogenated phenols, paradichlorobenzene, aromatic hydrocarbons, aliphatic hydrocarbons, halogenated hydrocarbons, soap, zeolites, polycarboxylates, disinfectants, optical brightener, defoamers, colorants, fragrances and mixtures thereof.

4. The delivery system according to claim 1, wherein the delivery system is in the form of a powder, a tablet, a pellet, or granules.

5. A home care formulation comprising a delivery system for the release of one or more active agent(s) according to claim 1.

6. The home care formulation according to claim 5, wherein the formulation is in form of a liquid, a powder, a paste, a gel, a bar, a cake, a pouch, a moulded piece or a tablet.

7. The home care formulation according to claim 5, wherein the formulation is a washing formulation; a washing formulation for cleaning of laundry, fabrics, dishes and hard surfaces; a pre-washing formulation; a rinsing formulation; a bleaching formulation; a laundry fabric-softener formulation; a cleaning formulation; and mixtures thereof.

8. A method for preparing a delivery system for the release of one or more active agent(s) in a home care formulation according to claim 1, the method comprising
a) providing magnesium carbonate having a specific surface area of from 25 to 150 m$^2$/g, measured using nitrogen and the BET method according to ISO 9277: 2010,
b) providing one or more active agent(s) in the form of a liquid or dissolved in a solvent, and
c) contacting the magnesium carbonate of step a) with the one or more active agent(s) of step b).

9. The delivery system according to claim 1, wherein the delivery system provides a release efficiency for the one or more active agent(s) of $\geq 72\%$.

10. The delivery system according to claim 1, wherein the delivery system provides a release efficiency for the one or more active agent(s) of $\geq 80\%$.

11. The delivery system according to claim 1, wherein the release efficiency is attained within a time period of 15 min.

12. The delivery system according to claim 1, wherein the magnesium carbonate has a specific surface area in the range from 35 to 58.8 m$^2$/g, measured using nitrogen and the BET method according to ISO 9277:2010.

13. The delivery system according to claim 1, wherein the magnesium carbonate has an intra-particle intruded specific pore volume in the range from 1.1 to 2.1 cm$^3$/g, calculated from mercury porosimetry measurement.

14. The delivery system according to claim 1, wherein the delivery system comprises the one or more active agent(s) in an amount ranging from 90 to 200 wt.-%, based on the total weight of the carrier material.

15. The delivery system according to claim 1, wherein the magnesium carbonate has a specific surface area in the range from 25 to 120 m$^2$/g, measured using nitrogen and the BET method according to ISO 9277:2010.

16. The delivery system according to claim 1, wherein the magnesium carbonate has an intra-particle intruded specific pore volume in the range from 0.9 to 2.3 cm$^3$/g, calculated from mercury porosimetry measurement.

17. The delivery system according to claim 1, wherein the magnesium carbonate has a $d_{50}$(vol) in the range from 1 to 75 μm, as determined by laser diffraction.

18. The delivery system according to claim 1, wherein the magnesium carbonate has a $d_{98}$(vol) in the range from 2 to 150 μm, as determined by laser diffraction.

19. The delivery system according to claim 1, wherein the magnesium carbonate contains up to 15,000 ppm Ca$^{2+}$ ions.

20. The delivery system according to claim 1, wherein the one or more active agent(s) at least comprise a detergent, an anionic surfactant, a nonionic surfactant, a cationic surfactant, an amphoteric surfactant, a softener, a sequestrant, a builder, an enzyme, an oxygen-based bleaching agent, a chlorine-based bleaching agent, an anti-scaling agent, a complexing agent, a dispersing agent, a soap, an optical brightener, or any mixture thereof.

21. The delivery system according to claim 1, wherein the one or more active agent(s) at least comprise an anionic surfactant, a nonionic surfactant, a cationic surfactant, an amphoteric surfactant, a softener, a sequestrant, a builder, an anti-scaling agent, a complexing agent, a dispersing agent, or any mixture thereof.

* * * * *